United States Patent Office 3,695,903
Patented Oct. 3, 1972

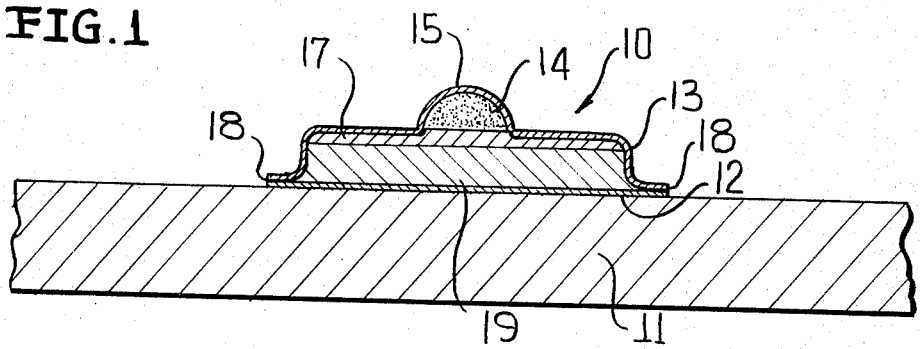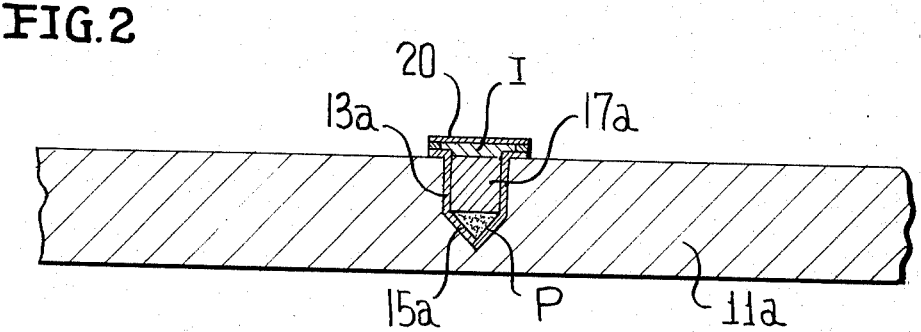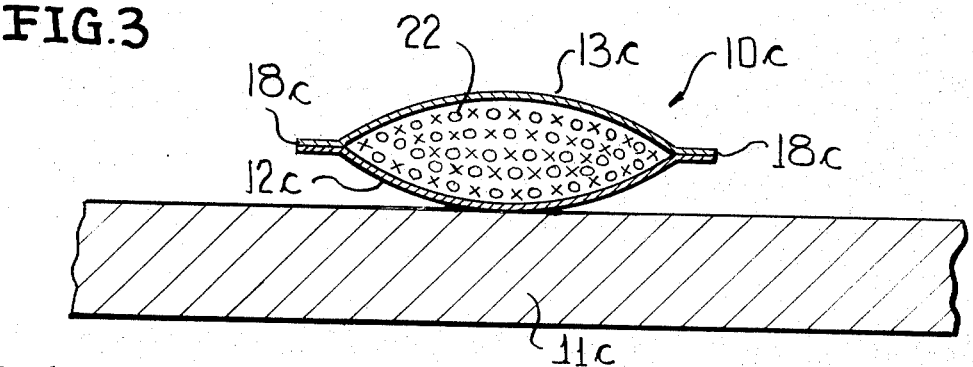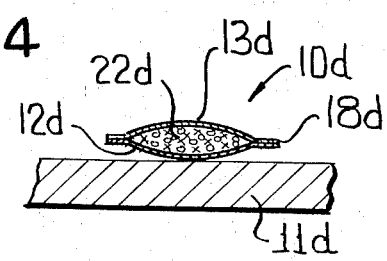

3,695,903
TIME/TEMPERATURE INDICATORS
Maria Telkes, Washington, D.C., and Henry Hahn, Fairfax, Va., assignors to American Standard Inc., Falls Church, Va.
Filed May 4, 1970, Ser. No. 34,262
Int. Cl. G01k *1/02, 3/00, 11/00*
U.S. Cl. 99—192 TT
14 Claims

ABSTRACT OF THE DISCLOSURE

A device for detection and indication of thawing of a frozen object. The device is attached to the frozen food and includes an indicator and a sensor which undergoes color change upon thawing to a preselected temperature below 100° F. In particular, a small transparent container of sensing material, comprising an organic gel exhibiting syneresis, in combination with an inorganic salt hydrate, is converted to the frozen state in proximity to a pH indicator, and the entire combination attached to the frozen food package or other frozen object. When the package or other object is exposed for a predetermined time to temperatures above that at which the sensing material melts, the latter becomes liquid and reacts with the pH indicator to produce a color change therein which is readily visible through the transparent container. Refreezing has no effect on the color change.

BACKGROUND OF THE INVENTION

The present invention relates generally to temperature indicators, and in particular to a device for indicating the attainment for a predetermined time interval of a predetermined thawing temperature to wihch a previously frozen object has been exposed.

A need presently exists for detecting the attainment by a frozen object of a predetermined temperature level, which may be below 100° F., and more specially, below normal room temperature. It is quite common to use thermometers for the purpose of measuring temperature, and special thermometers are available to measure upper and lower limits of temperature, above and below a certain threshold, to indicate the highest and lowest temperature limits attained during a time interval by a specified object or environment. In general these thermometers are relatively large and relatively expensive. The freezing of food, biologicals, and other materials, frequently requires temperature levels well below zero degrees F. After such freezing it is important that knowledge be continuously available that the required low temperatures have been maintained during storage or transport of the frozen material, and if not, to have an indication of the time elapse during which thawing occurred. In the case of frozen food, for example, it is essential to the purchaser and to the distributor of the food to know whether the frozen food has been accidentally thawed for an appreciable time during shipment or storage. Once thawed, the formerly frozen food is subject to spoilage, which would be masked by subsequent re-freezing. Frozen food which has been allowed to thaw and which has thereafter been re-frozen may cause food poisoning, or may become distasteful.

Some temperature indicators utilize a solid or frozen sensor material, applied to the surface to be monitored for temperature change, the melting of this material producing a color change of an indicator or causing a background visibility change. In general, such materials and combinations of materials are unstable at room temperature, and the packaged indicator device must normally be handled in the frozen or solid form, which is undesirable. Patented devices which fall into this category are disclosed in U.S. Letters Patent Nos. 3,312,079, 3,118,774, 3,243,303, 3,047,405 and 3,002,385, for example. Another type of device employing color change to indicate the attainment of a predetermined temperature by a surface of an object whose temperature is being monitored, requires the rupture of a partition or thin film during initial freezing. On thawing reaction occurs with a color indicator, showing that the package to which the device is attached has thawed. Devices falling in this category are described in U.S. Letters Patent Nos. 3,194,669, 3,055,759, and 2,850,-393, for example.

It is a principal object of the present invention to provide indicators adapted to indicate time/temperature relationships for such standard items as frozen foods, frozen biologicals, and other frozen materials, which can be installed on an object to be monitored while the latter and the indicator are unfrozen, which are triggered into a ready condition when freezing occurs, and which then provide a visible indication in response to thawing.

SUMMARY OF THE INVENTION

According to one embodiment of the present invention, a small transparent container of sensing material, which includes an organic gel combined with an inorganic salt hydrate, and which may be in sheet form, is isolated by a porous separator from a color change indicator, which may also be incorporated in sheet material. The gel exhibits syneresis, in that it decomposes to liquid or partially so when frozen, but is stable prior to that time, the liquid evolved during syneresis being ready to react with the indicating material when subjected to its melting temperature. At that time the liquid sensing material is carried through the porous separator to the indicator, and causes a change in color of the latter.

The invention contemplates the use of several sensing materials, each of which has a different melting temperature, to provide narrow temperature ranges each having a maximum temperature as the thawing temperature to which the previously frozen object (such as a frozen food package) has been exposed, for a sufficient period of time to melt the respective sensing materials.

According to a further embodiment of the invention, a plug-type container for sensing the time during which thawing temperatures existed, is pressed into the core of the frozen object. The device includes sensing material in a region at the tip of the container and indicator material exists in a porous separator or wick extending along a transparent shaft of the plug into contact with the sensing material, or the wick is neutral and an indicator is provided at its termination remote from the sensing material.

According to the present invention, the indicating device requires exposure of the object or package to which it is attached to a thawing temperature over a period of time sufficient to thaw the product of syneresis, and thereafter for that product to travel to a chemical indicator, whereupon an indication is generated and the character of the indication is representative of the time during which thawing was sustained, and of the thawing temperature, in a rather complex relationship.

BRIEF DESCRIPTION OF THE DRAWINGS

FIG. 1 is a view in vertical section of an embodiment of the invention;

FIG. 2 is a vertical sectional view of another embodiment of the invention;

FIG. 3 is a vertical sectional view of still another embodiment of the invention;

FIG. 4 is a vertical sectional view of a further embodiment of the invention.

DESCRIPTION OF THE PREFERRED EMBODIMENTS

The present invention utilizes temperature sensing materials which are stable at room temperature without providing an indication, but which react to provide an indication on thawing which occurs after freezing. In particular, a gel forming agent is mixed or combined with a sensing material and a chemical indicator are packaged in a transparent container, for attachment of the latter to a product whose temperature changes are to be monitored. According to a critical aspect of the invention, thickening agents or gels which exhibit syneresis, for example, Kelgum, a natural colloid manufactured by Kelco Company of Clark, N.J., or methylcellulose, are combined with sensing material. Such agents are stable at room temperature. They contain water, but the latter is bound. This permits the sensing material to be handled at room temperatures prior to attachment to a frozen product, or to an unfrozen product which is to be frozen, and to prevent it from interacting, during that handling, with the chemical indicator material. The thickening agent must be capable of exhibiting syneresis, i.e., decomposition of the gel into water and modified gel of lower water content, when subjected to freezing temperature. This serves the function of freeing the sensing material, upon freezing, so that it is ready to react with the chemical indicator material, on thawing to a predetermined melting temperature.

In accordance with the present invention, syneresis of the gel is essential because the temperature sensing material need not be subjected to special handling or special processing prior to freezing as has been the case with prior art types of temperature indicating devices, but can exist at room temperatures for long periods of time; and it will remain indefinitely activated, once frozen, ready to release or exude its sensing solution as soon as the latter attains its normal melting point.

Typically, the sensing materials utilized herein are otherwise conventional, such as aqueous salt solutions or salt-hydrates, being normally colorless solids or translucent crystalline materials. When, after syneresis, ambient temperature is raised to a level that depends on the character of the solution released by the gel, preferably a temperature below 100° F., the colorless material melts. In order to observe the phase change resulting from the temperature increase, the liquid is absorbed by a suitably positioned porous material, such as filter paper or a thin sponge layer. This layer is preferably impregnated with a suitable indicator material, or it may separate the sensing material in its thickened form from the indicator material, with which the liquid is to react. The indicator responds to contact with the melting sensing material to form a highly colored spot which is readily visible. Since thawing is gradual, and dispersion of the liquid through the porous material is slow, the extent of the spot becomes an indicator of time elapse from initiation of thawing.

Referring now to FIG. 1, a sectional view of a suitable overall indicating device 10 for time/temperature detection is to be attached to an object 11 which is either presently frozen or which is to be frozen, for the purpose of monitoring the temperature of the frozen object and visually indicating that a rise in ambient temperature above a pre-designated level considered dangerous to the preservation of the frozen product, has taken place following freezing. The indicating device 10 includes or is enclosed between walls 12 and 13, wall 12 being in direct contact with object 11 when the indicating device is attached to the object, and wall 13 being exposed to view, the latter especially is therefore preferably composed of a low-temperature-resistant plastic or other transparent or translucent material. The wall 13 has a small cuplike extension 14, filled with the sensing material, including the syneresis-exhibiting gel 15. A thin porous layer 17 such as filter paper, overlies a layer 19 containing a pH indicator, both enclosed between container layer 12 and 13 by cementing or bonding together the common periphery of these two layers at seal 18.

Preferably the device 10 is fabricated in the following manner First, the layer 13 is inverted and a temperature sensing material (including gel) 15 is deposited in the small cup-shaped extension 14. The entire diameter of the over-all device may be as small as $\frac{1}{16}$ to $\frac{1}{2}$ inch, and in that instance only a very small quantity of sensing material is required. The porous layer 17 is used as a separator between the sensing material 15 and the indicator material 19, or it may be itself impregnated with the indicator material. In either event, the porous layer 17 is placed adjacent sensing material 15 and the tow walls 12 and 13 are brought into proper registry for sealing at the periphery 18 while the sensing material is in its gel form. The completed device may then be frozen along with the frozen object to which it is attached or may be frozen separately therefrom to eventually become part of the cold object. The sensing material gel 15 remains in the gel form indefinitely when at room temperature, but when it has been frozen it undergoes syneresis, i.e. exudes or releases water-solution which assumes the frozen state. Thus, the sensing material once frozen remains indefinitely activated and will reassume the liquid form as soon as the predetermined thawing temperature is attained.

The sensing material 15 should be composed of a non-toxic material, particularly if it is to be used in conjunction with frozen foods or with frozen biologicals. This implies that sensing material 15 is harmless to the object to which it is attached and to the packaging envelope for that object if any, should it be inadvertently released. Preferably the sensing material is mixed with a small amount of additive to vary its pH value. A chemically neutral sensing material may be made slightly alkaline by adding a small amount of borax or other mildly alkaline substance to it when the sensing material is in its liquid form. Sensing materials which are not compatible with alkalinity may be made slightly acid by mixing with a dilute solution of acetic acid or other suitable harmless acid.

The indicator material, which is either impregnated in porous layer 17 or underlies layer 17 in the form of a sheet 19, is essentially a pH indicator that changes color at a definite pH level. For alkaline sensing materials an indicator such as phenolphthalein is used, which becomes deep purple when activated. A wide variety of indicators of course is available both for slightly alkaline and for slightly acidic conditions.

In operation of the device of FIG. 1, the unit 10 is secured to a frozen object 11 and automatically follows the temperature of that object at the point of attachment. When this temperature increases and transgresses the melting point of the sensing material, that portion of the sensing material which has been exuded from the gel by decomposition as a result of freezing of the syneresis exhibiting gel, passes through the porous layer and acts upon or reacts with the indicator material therein on the other side of the porous layer. Thus, the liquid sensing material changes the color of the indicator either from colorless pale to a deep and highly visible color. It is essential that the color contrast (i.e., before and after activation) be visually significant, to permit ready and easy observation of the indication that the object has attained and remained at the melting temperature for a predetermined time. Once the color change has occurred, the indicating device may be again frozen but the color change is permanent and cannot be obliterated by refreezing. Accordingly, the observer on seeing the color change, is immediately apprised of the fact that a predetermined time/temperature relationship has been attained by the object at least at the point of attachment of the indicating device and this telltale warning remains effective despite subsequent processing of the object to which the device is attached.

Several sensing materials, that is materials which melt at respectively different temperatures, may be assembled into a single unit by using several slightly separated sensing cups over a single common indicator. In such case all of the sensing materials must have the same pH value and must be compatible. Or, single masses of gel 15 may be employed having diverse but compatible sensing materials melting at different temperatures.

A frozen food package can be considered as an example of an object which is normally kept at the temperature of below 0° F. During shipment or during handling in a store or market the temperature may temporarily increase to a higher level and as soon as the material begins to thaw, about 28° F. to about 32° F., the danger of deterioration and spoilage begins. A sensing element may be desired to show 28° F., and another may be desired to indicate a temperature above 32° F., possibly in the 35° to 40° F. temperature range. It is desirable that in such case the sensing unit be clearly marked with the temperature indicated thereby or with suitable words indicating the extent of thawing.

In some instances a package such as that used for frozen foods may have a higher surface temperature than the core temperature. In such case a sensing and indicating device attached to the surface of the frozen package would only indicate that the surface had reached the predetermined temperature at which the sensing unit is activated but would not necessarily provide any information concerning the thawing of the core of the frozen food package. An embodiment which may be utilized to indicate thawing at the core of an object is illustrated in FIG. 2.

Referring now to FIG. 2, the object which is to be temperature monitored is designated by reference character 11a. The object 11a is penetrated by a relatively sharply pointed probe P which at its point retains a small amount of sensing material 15a mixed with the gel thickening agent. These materials may of course be identical to those previously described. The porous layer 17a, like that previously described, is in the form of a wick or a scroll and is either impregnated with indicator material or may separate the sensing material 15a from the indicator material I. In any event, the porous layer 17a and indicator material I are placed inside a cover 13a of the probe which is closed by a seal 20 of transparent material. When the temperature of the object 11a under observation increases to the melting point of the sensing material 15a the latter melts and the resulting liquid travels up the wick 17a, and interacts with the indicator I, developing a deep color change. As more sensing material melts more of the porous layer 17a, acting as a wick, develops the color change. The volume of the sensing material 15a and of the indicator material I are preselected to permit proportionate color change with time exposure.

In some instances it may be desirable to employ an extremely small temperature sensing and indicating device and such a miniaturized form of device is provided in the following manner. Referring to FIG. 3, the indicator is indicated generally at 10c attached to a normally frozen object 11c. The indicator 10c includes a container cover 13c joined to a container base 12c along a seal 18c. The indicator 10c contains a mixture 22 which includes either a dilute acid or alkaline material dispersed in a syneresis exhibiting gel and then mixed with a powdered color change indicator material. The mixture is frozen and pulverized and is then packed between the cover 13c and the base 12c and sealed along 18c. The mixture of the above components is either a colorless white or slightly tinted powder as long as the combination remains frozen. When the temperature increases above the melting point of the sensing phase change material that material undergoes melting and dissolves the indicator powder which changes color remaining indelible even after the mixture is frozen. The indicator 10c and its contained powdered sensing and indicating material may be a very tiny capsule or flat sticker or a hollow bead or needle-like structure which should of course be transparent in at least the region that is observable relative to the object to which it is attached.

While there are a great number of materials useful in the practice of the present invention some of the temperature sensing materials and the temperatures sensed are as follows:

Potassium nitrate: 12.2 weight percent in water, 27° F. melting point

Potassium chloride: 19.7 weight percent in water, 12° F. melting point

Ammonium sulfate: 40.0 weight percent in water, 2° F. melting point

Magnesium chloride hexahydrate: 44.5 weight percent in water, 28° F. melting point Some of the color change indicating materials useful in practicing the invention are: phenolphthalein and bromothymol blue. Some of the organic syneresis exhibiting gel forming materials useful in practicing the invention are: Kelgum and methylcellulose.

A specific example of an indicator which shows a color change at 12° F. is as follows:

Potassium chloride solution 19.7 percent by weight in water was prepared and two drops per 100 cc. of solution of 5 percent potassium hydroxide as an actuator was added thereto to adjust the pH. 1.0 percent by weight of Kelgum was added to the solution to produce a syneresis exhibiting gel.

A phenolphthalein indicator for indicating by a color change the presence of basic materials was used with the above sensing material to produce the indicator illustrated in FIG. 1 with the porous material 17 comprising a filter paper.

In FIG. 4 another modified form of the invention is illustrated wherein the reference numeral 10d indicates generally an indicating device constructed in accordance with the invention. The device 10d is attached to a normally frozen object 11d by any suitable means. The device 10d includes a plastic base 12d and a transparent plastic cover 13d which are sealed together peripherally along a seal line 18d. The sealed together base 12d and cover 13d comprise a container in which is an intimate mixture 22d of an indicating material as described above and a temperature responsive material in the form of micro-miniature capsules which individually each contain a temperature sensing material including an actuator for the indicator. The capsules are ruptured on freezing so that the actuator when thawed will cause a color change in the indicator. The sensing material is an inorganic salt hydrate containing a pH adjusting indicator actuator.

The capsule material is preferably lipophilic, and may be made of fats, waxes, water insoluble resins and polymers or mixtures of these. The specific composition of the capsule will depend upon the ability of the capsule to rupture reliably on freezing to release its contents on thawing. The capsule size is preferably in the range from 1,000 to 3,500 microns.

Since many materials exhibit the properties required for practicing the invention, it should be understood that substitutes of suitable materials and structural modifications may be resorted to without departing from the spirit of the invention.

We claim:

1. A time/temperature indicating device, comprising a pH indicator which exhibits a substantial color change in response to contact with an inorganic salt hydrate activator, a temperature sensing material including said activator operatively associated with an organic gel which is stable and non-liquid at room temperature and which is operative on subjection to a temperature below the freezing temperature of said gel to undergo syneresis, said activator being selected to modify the color of said pH indicator only when said activator is in liquid solution consequent on warming of said temperature sensing material to a temperature above the freezing temperature of water occurring subsequent to said subjection to a temperature below said freezing temperature of said gel, and transparent container means for said sensing material and said indicator.

2. A time/temperature indicating device, comprising a pH indicator which exhibits a substantial color change in response to contact with an activator, a temperature sensing material including said activator operatively associated with an organic gel which is operative on subjection to a temperature below the freezing temperature of said organic gel to undergo syneresis, and transparent container means for said sensing material and said indicator, wherein said activator includes an inorganic salt hydrate.

3. The device of claim 1, wherein said container means includes a sealed transparent package having a dome containing said temperature sensing material.

4. The device as claimed in claim 2, wherein the container means includes a hollow probe having a transparent cover sealed thereto.

5. The device as claimed in claim 1, wherein said container means comprises a sealed capsule with said temperature sensing material and said indicator contained in said capsule in intimate mixed relation.

6. A device for indicating the duration of exposure to a thawing temperature of a normally frozen object, said device comprising a water soluble inorganic salt hydrate activator, a pH indicator material which exhibits a substantial color change in response to said activator only when said activator is liquid, a temperature sensing material including said activator being suspended in an organic gel which is stable and non-liquid at room temperature and which on subjection to temperatures below the freezing temperature of said organic gel undergoes syneresis to release water which freezes, and means physically maintaining said temperature sensing material and said indicator material in communication.

7. A device as claimed in claim 6, wherein said temperature sensing material and said indicator material are intimately mixed in said device.

8. A device as claimed in claim 7, wherein means porous to water and located in said device separates said temperature sensing material from said indicator material.

9. The combination according to claim 2, wherein is provided porous means separating said organic gel from said pH indicator.

10. The combination according to claim 2, wherein said last means is a layer of filter paper.

11. The combination according to claim 2, wherein said last means is a porous plug.

12. The combination according to claim 1, wherein is included porous means separating said temperature sensing material from said indicator within said capsule.

13. The combination according to claim 1, wherein said gel, said indicator and said activator are intimately mixed within said capsule at room temperature prior to said freezing.

14. A device for indicating that a body has been frozen and thereafter thawed, a transparent capsule containing an organic gel combined with an inorganic salt hydrate activator, a pH indicator, said gel being selected to be stable at room temperature and to release $H_2O$ by syneresis on freezing, said capsule further including a quantity of said pH indicator so located as to be wet by said $H_2O$ when released from said gel and thereafter thawed to above its freezing temperature.

References Cited
UNITED STATES PATENTS

| | | | |
|---|---|---|---|
| 2,716,065 | 8/1955 | Beckett et al. | 99—192 TT |
| 3,047,405 | 7/1962 | Lanier | 99—192 TT |
| 2,460,215 | 1/1949 | Chase | 99—192 TT |
| 3,038,812 | 6/1962 | Berman et al. | 99—192 TT |
| 3,243,303 | 3/1966 | Johnson | 99—192 TT |
| 3,615,719 | 10/1971 | Michel | 99—192 TT |
| 3,194,669 | 7/1965 | Koch | 99—192 TT |

JOSEPH SCOVRONEK, Primary Examiner

U.S. Cl. X.R.

23—253 TP; 73—358; 116—114.5